United States Patent
Ikeda et al.

(10) Patent No.: US 6,470,137 B1
(45) Date of Patent: Oct. 22, 2002

(54) METHOD AND APPARATUS FOR SUPERIMPOSING A LEVEL CHANGED SPECTRUM SPREAD ADDITIONAL INFORMATION SIGNAL ON A VIDEO SIGNAL

(75) Inventors: Nozomu Ikeda; Akira Ogino; Hisayoshi Moriwaki; Takashi Kohashi, all of Tokyo; Yuji Kimura, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/140,725

(22) Filed: Aug. 27, 1998

(30) Foreign Application Priority Data

Aug. 29, 1997 (JP) .............................. 9-234695

(51) Int. Cl.[7] .............................. H04N 5/91
(52) U.S. Cl. .......................... 386/94; 360/60; 375/130; 380/203
(58) Field of Search .............. 386/1, 94; 360/60; 380/201, 203, 204, 205, 210; 375/130, 135, 140, 146, 141

(56) References Cited

U.S. PATENT DOCUMENTS 5,910,964 A * 6/1999 Sugita ........................ 375/200
6,023,551 A * 2/2000 Sugita et al. ................. 386/94
6,058,243 A * 5/2000 Ogino et al. ................. 386/94
6,069,665 A * 5/2000 Ikeda et al. ................. 348/478
6,271,887 B1 * 8/2001 Ogino et al. ................ 348/478

FOREIGN PATENT DOCUMENTS

| EP | 0360615 | * | 3/1990 |
| EP | 0778556 | * | 6/1997 |
| EP | 0838946 | * | 4/1998 |
| EP | 0843473 | * | 5/1998 |
| EP | 0848550 | * | 6/1998 |
| EP | 0848551 | * | 6/1998 |
| EP | 0849945 | * | 6/1998 |

* cited by examiner

Primary Examiner—Andrew Christensen
Assistant Examiner—Po-lin Chieu
(74) Attorney, Agent, or Firm—Jay H. Maioli (57) ABSTRACT

Visual influence on the reproduced image by the spectrum spread additional information signal can be controlled on the reproduced image by sequentially changing the level of the spectrum spread additional information signal with the predetermined pattern in each chip section on the occasion of superimposing, on the video signal, the spectrum spread additional information signal in which the additional information such as duplication preventing control information and copy right information, etc. is spectrum spread.

12 Claims, 10 Drawing Sheets

↓ DCT COEFFICIENT

FIG. 2C

| DC | AC1 | AC5 | AC6 | | | | |
|----|-----|-----|-----|---|---|---|---|
| AC2 | AC4 | | | | | | |
| AC3 | | | | | | | |
| | | | | | | | |
| | | | | | | | |
| | | | | | | | |
| | | | | | | | |
| | | | | | | | |

DUPLICATION PREVENTING CONTROL SIGNAL
SPECTRUM BEFORE SPECTRUM SPREAD

FIG. 8B

DUPLICATION PREVENTING CONTROL SIGNAL
SPECTRUM AFTER SPECTRUM SPREAD

FIG. 8C

INFORMATION SIGNAL SPECTRUM WHERE THE SS DUPLICATION PREVENTING CONTROL SIGNAL IS SUPERIMPOSED

FIG. 8D

SIGNAL SPECTRUM AFTER THE INVERSE SPECTRUM SPREAD IN THE RECORDING APPARATUS SIDE

METHOD AND APPARATUS FOR SUPERIMPOSING A LEVEL CHANGED SPECTRUM SPREAD ADDITIONAL INFORMATION SIGNAL ON A VIDEO SIGNAL

BACKGROUND OF THE INVENTION

1. Field of the Invention

The present invention relates to a method and an apparatus for superimposing an additional information to a video signal in such a manner as giving least influence on the reproduced image.

2. Description of Related Art

A digital information recording apparatus such as a digital VTR or MD (Mini-Disc) recording and reproducing apparatus are widely spreading and moreover a DVD (digital video disc or digital versatile disc) apparatus providing the recording function has also be developed. In these digital information recording apparatuses, various additional information signals can be recorded in relation to a digital video signal and a digital audio signal as the main information signals and moreover to a computer data.

In this case, this additional information signal is a digital signal and is added to a digital information signal as the signal recorded to the area which may be regionally discriminated from the digital information signal such as a header section which is added, for example, to the data in unit of block of the digital information signal and the other TOC (Table of Contents) area, etc.

In the case of the system where the additional information is superimposed to the existing main information signal for the purpose of recording and transmission, the additional information signal is not superimposed in direct to the digital information signal in the header section but is added to the indirect area. Therefore, the additional information signal can easily be removed by the filtering or alteration, making it impossible, in some cases, to detect the necessary additional information signal in a recording apparatus or a reproducing apparatus. Particularly, when a control information and a copy right information to prevent unfair duplication is added as the additional information signal, it is liable to occur that the predetermined target cannot be attained because such additional information signal is removed.

Moreover, when the additional information signal is added to the indirect area as explained above, if the digital information signal is converted to the analog signal, only the main information signal can be obtained, while the additional information signal is removed. It means that if a duplication preventing control signal as explained above is superimposed as the additional information signal to prevent unfair duplication of the digital information signal, when such digital signal is converted to the analog signal, such duplication preventing means is already lost.

As the additional information signal superimposing system to solve the problems occurring when the additional information signal is removed and when the digital signal is converted to the analog signal, the applicant of the present invention has already proposed a system in which the additional information signal such as a duplication preventing control signal is spectrum spread and the spectrum spread additional information signal is superimposed on a video signal and the video signal is recorded by the digital data or analog data (U.S. patent application Ser. No. 08/75510).

In this system, a PN (Pseudorandom Noise) series code (hereinafter referred to as PN code), for example, which is used as the spreading code is generated in a higher period and it is then multiplied with an additional information signal for the purpose of spectrum spread. Thereby, the additional information signal such as narrow band and high level duplication preventing control signal can be converted to a broad band and very low level signal which does not give any influence on the video signal. This spectrum spread additional information signal, namely the spectrum spread signal is superimposed to an analog signal for the purpose of recording on a recording medium. In this case, the video signal to be recorded on the recording medium may be an analog signal or a digital signal as desired.

In this system of the related art, since the additional information signal such as the duplication preventing control signal is superimposed in the same time and same frequency as the video signal, it is difficult for a person who is trying to conduct illegal duplication to remove the superimposed duplication preventing control signal from the video signal. Meanwhile, it is possible to detect for utilization of the superimposed additional information signal such as duplication preventing control signal by the inverse spectrum spread.

Since the additional information superimposed to the video signal is not removed from the video signal at the time of reproducing operation, the additional information must be superimposed, as is explained above, to the video signal in such a low level as not giving influence on the reproduced image of the video signal. However, although it must be in a low level, the additional information is requested to be in the level which can be detected.

As explained above, the duplication preventing control signal can surely be provided for the recording apparatus side together with the video signal and this duplication preventing control signal can be detected in the recording apparatus side to realize reliable duplication control depending on the detected duplication preventing control signal.

On the other hand, when the video signal is recorded as the digital signal, the video signal is blocked in unit of a plurality of pixels and this video signal is compressed in unit of block. Therefore, it can be thought that one chip of the spread code to produce the spectrum spread signal is assigned to one block and the spectrum spread additional information is superimposed to the video signal.

However, in this case, when the superimposing level per chip assigned to one block is set to the constant level in accordance with the levels "0" and "1" of the spectrum spread signal, the superimposing level of the additional information changes in unit of block, resulting in the possibility that the partitioning area of the images in unit of block can be observed.

SUMMARY OF THE INVENTION

It is therefore an object of the present invention to provide a superimposing method and apparatus for preventing deterioration of reproduced image due to the superimposed additional information.

The method and apparatus for superimposing the additional information to a video signal of the present invention is characterized in producing, in synchronization with the video signal, a spectrum spread code having a chip section corresponding to each period of a plurality of predetermined pixels of the image of the video signal, producing a spectrum spread additional information signal by spectrum spreading the additional information signal with the spectrum spread code, producing a level changed spectrum spread additional information signal by sequentially changing the level of the spectrum spread additional information signal with the predetermined pattern in the period corresponding to each chip section and then producing an output video signal by superimposing the level changed spectrum spread additional information signal to the video signal.

Thereby, since the level of the spectrum spread additional information signal is not constant in unit of the period corresponding to a plurality of pixels and sequentially changes, the additional information signal can be superimposed to the video signal without observation of the partitioning area in every plural pixels on the reproduced image.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DESCRIPTION OF THE PREFERRED EMBODIMENTS

The preferred embodiments of the present invention will be explained with reference to the accompanying drawings. In the preferred embodiment explained below, the video signal is compressed as the digital signal by the compressing system utilizing the DCT conversion (discrete cosine conversion) such as the MPEG2 system and such compressed video signal is transmitted through the network or is transmitted by the method that it is recorded in the recording medium.

Figure 2A:
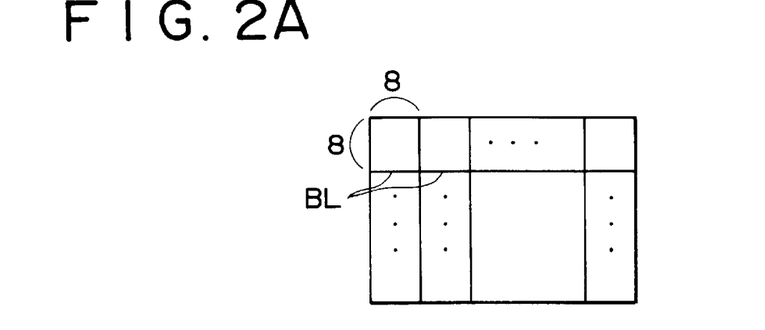
FIGS. 2A to 2C are diagrams for mainly explaining a preferred embodiment of the additional information superimposing method of the present invention.
Figure 2B:
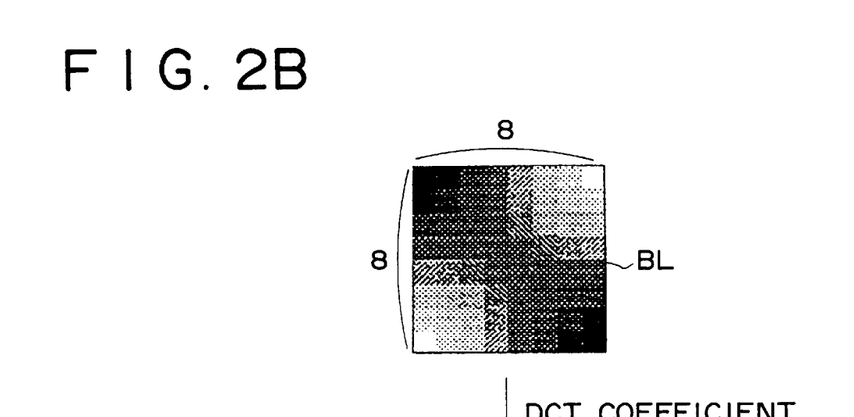
Figure 2C:
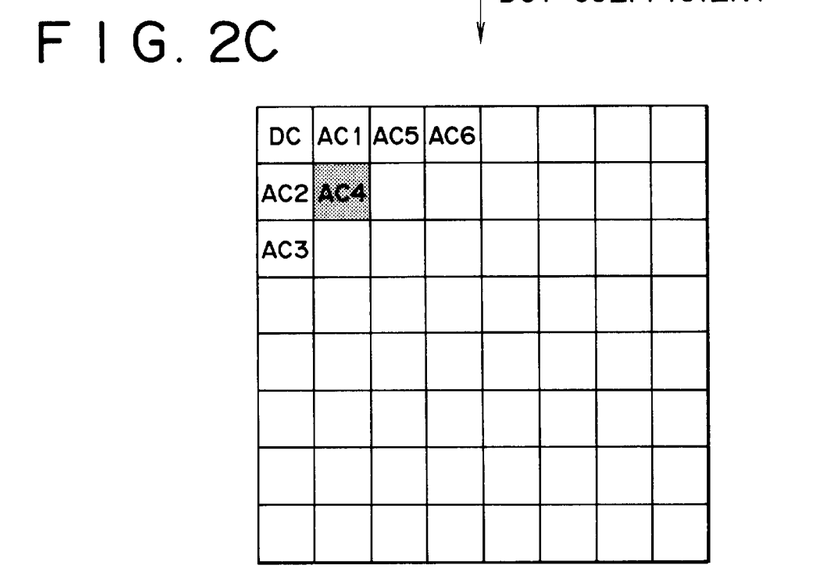

As shown in FIGS. 2A to 2C, one image format of one frame (or one field) of the video signal is divided into a block BL in every rectangular region consisting, for example, of 8 ixels in the horizontal direction and 8 ixels in the vertical direction. The additional information is superimposed as the spectrum spread signal to the video signal in such a manner that one chip of the spread code is assigned to one block.

The spectrum spread signal as the additional information is superimposed to the video signal in such a manner that the positive level is superimposed when the value of one chip of the spectrum spread signal is "0" for the video signal, while the negative level is superimposed when the value is "1". The level to be superimposed is not constant as one chip and the level which is changed in the predetermined fixed pattern is superimposed.

In this embodiment, in order to conduct the duplication preventing control for the transmitted digital video signal, the duplication preventing control signal is superimposed to the video signal as the additional information. This duplication preventing control signal may be the signal having the content, for example, of the duplication generation limitation acknowledging only duplication of the fist generation or may be the signal inhibiting or acknowledging duplication of the video signal and this duplication preventing control signal is formed of one bit or several bits.

Moreover, the spectrum spread signal is superimposed to the luminance signal Y of the video signal but not superimposed to the color signal C. It is naturally possible to superimpose the spectrum spread signal to the color signal C. However, since the color signal of the video signal reproduces the color, for example, with the elements of two phase axes such as the color difference signal, when the spectrum spread signal is superimposed to the color signal, the spectrum spread signal, even if it is every low level, generates rather visible change of hue. Therefore, it is difficult to superimpose the spectrum spread signal to the video signal without influence on change of hue. Accordingly, in this embodiment, the spectrum spread signal is superimposed only to the luminance signal. However, in order to simplify the explanation, the luminance signal Y and color signal C are expressed as the video signal without discrimination.

Figures 1, 1B:
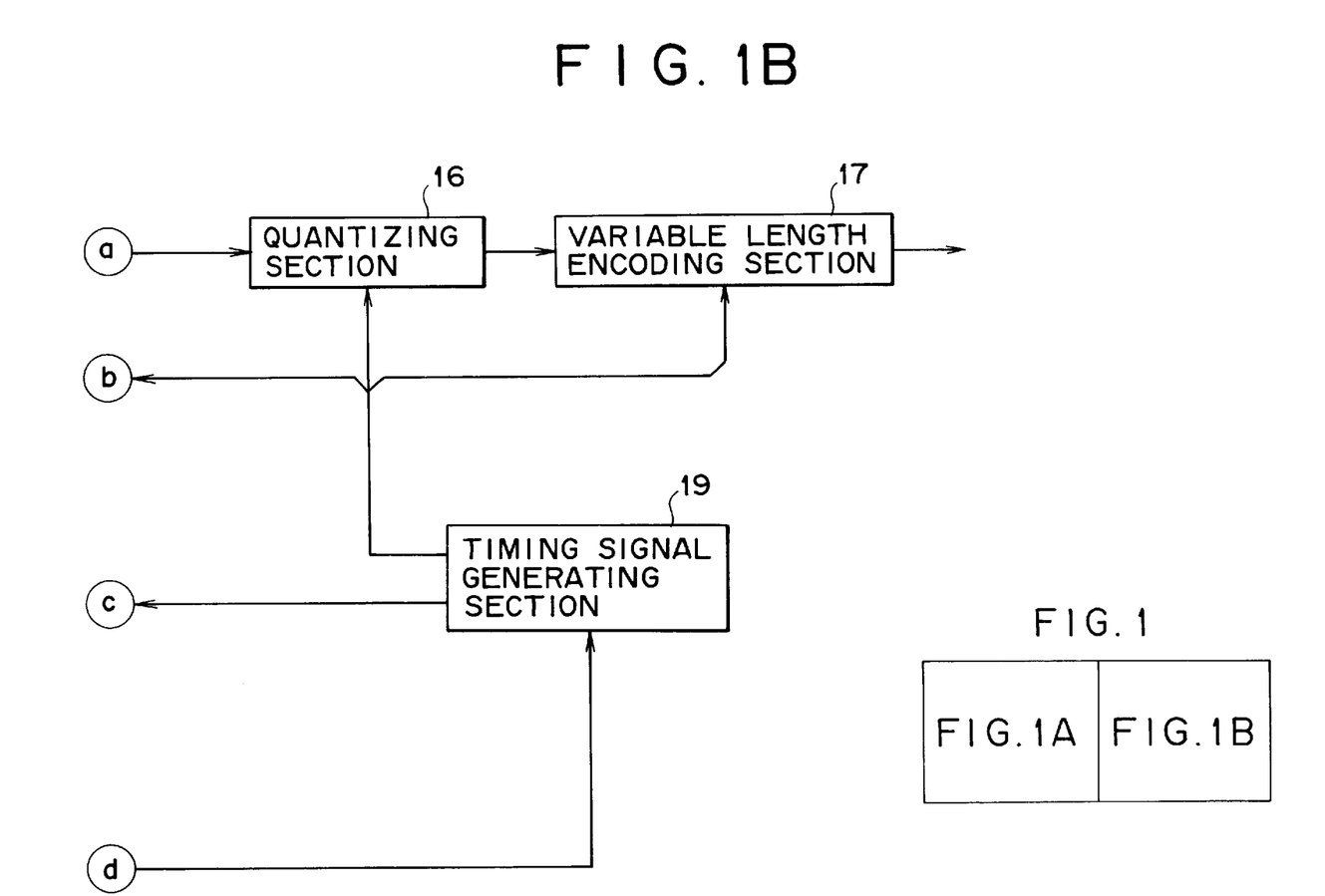
FIG. 1 is a block diagram showing an example of the apparatus to which a preferred embodiment of the additional information superimposing apparatus of the present invention is applied.
Figure 1A:
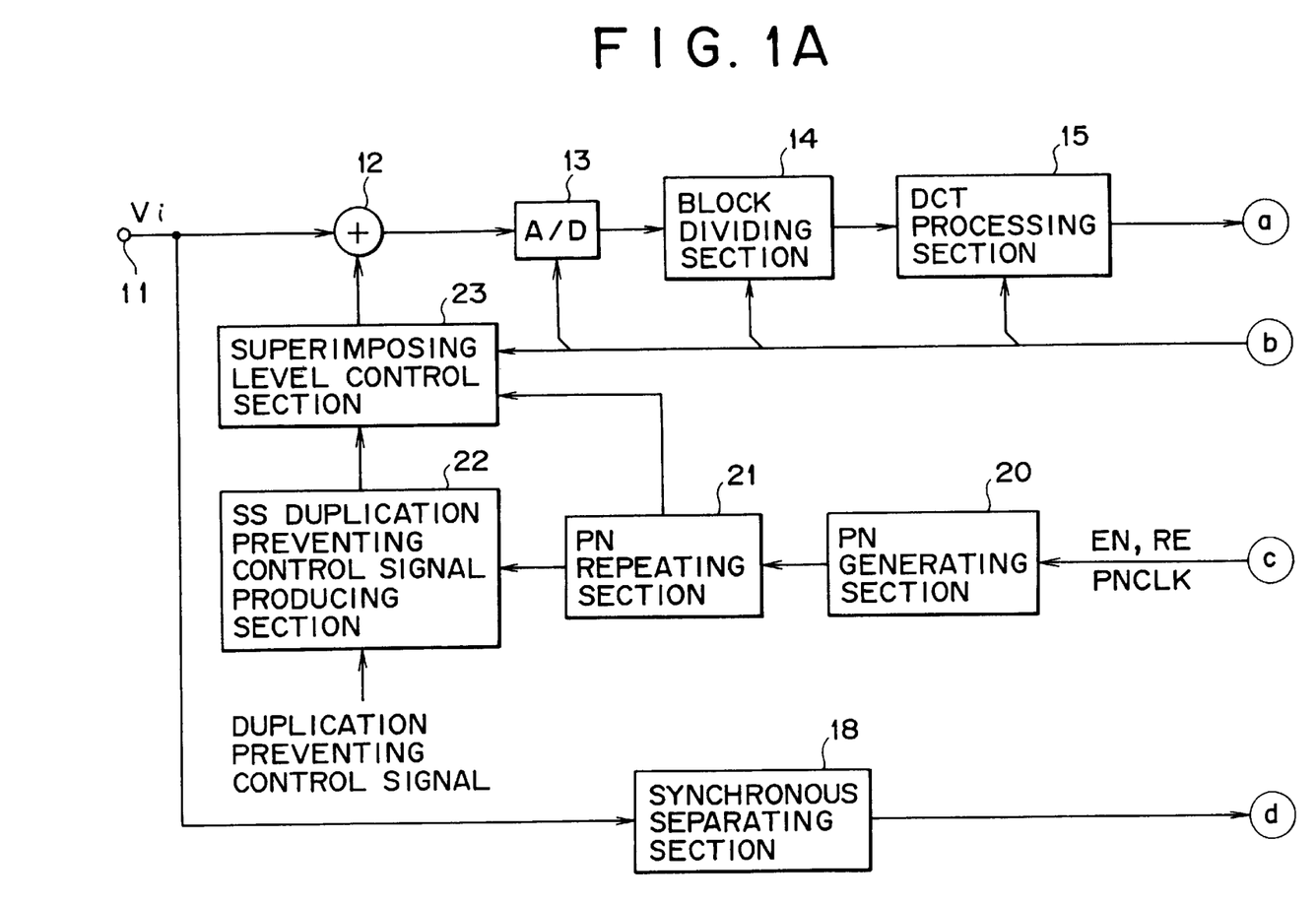

FIG. 1 is a block diagram showing an example of the additional information superimposing apparatus in this embodiment.

An analog video signal Vi input through the input terminal 11 is supplied to a level adding circuit 12 as the superimposing section and also to a synchronous separation circuit 18. The synchronous separation circuit 18 separates the horizontal synchronous signal H and vertical synchronous signal V from the analog video signal Vi. The separated horizontal synchronous signal H and vertical synchronous signal V are then supplied to a timing signal generating section 19.

The timing signal generation section 19 uses the horizontal synchronous signal H and vertical synchronous signal V as the reference signal and produces a timing signal to execute the compression process to the digital video signal. The timing signal generating section 19 also produces, as explained later, a PN generation enable signal EN indicating the section for generating the PN code as the spread code to produce the spectrum spread signal, a PN code reset timing signal RE (hereinafter, referred to as reset signal RE) indicating the PN code generation start timing and a PN clock signal PNCLK.

To a level adding circuit 12, the spectrum spread (hereinafter the spectrum spread is abbreviated as SS) duplication preventing control signal (SS duplication preventing control signal) is supplied from the SS duplication preventing control signal producing section 22 via the superimposing level control section 23. In this case, as explained above, the SS duplication preventing control signal is supplied to the level adding circuit 12 in such a manner that when one chip is "0", the positive level is added and when one chip is "1", the negative level is added namely subtraction is conducted.

Moreover, as will be explained later, one chip is assigned to every block BL and the superimposing level of one chip is defined as the predetermined fixed pattern and the spectrum spread signal in which the duplication preventing control signal is spectrum spread is superimposed to the analog video signal Vi through the level addition or level subtraction.

After the video signal in which the spectrum spread duplication preventing control signal is superimposed is converted to the digital signal in the A/D converter 13, it is then supplied to a block dividing section 14 and is then divided, as shown in FIG. 2A, to the block BL consisting of 8 ixels in the horizontal direction and 8 ixels in the vertical direction. The data in unit of block is supplied to the DCT processing section 15 from this block dividing section 14. In this DCT processing section 15, the video signal is divided in unit of block BL by the timing signal sent from the timing signal generating section 19 for the purpose of DCT arithmetic processing.

The arithmetic processing result from the DCT processing section 15 is supplied to a quantizing section 16 for the purpose of quantization. An output of the quantizing section 16 is supplied to the DCT processing section 15 via a motion compensating circuit (not shown) for the DCT arithmetic operation of the motion element.

An output of the quantizing section 16 is subjected to the variable length encoding in the variable length encoding section 17 using the Huffman code and it is then output for transmission, for example, such as recording.

Figure 3:
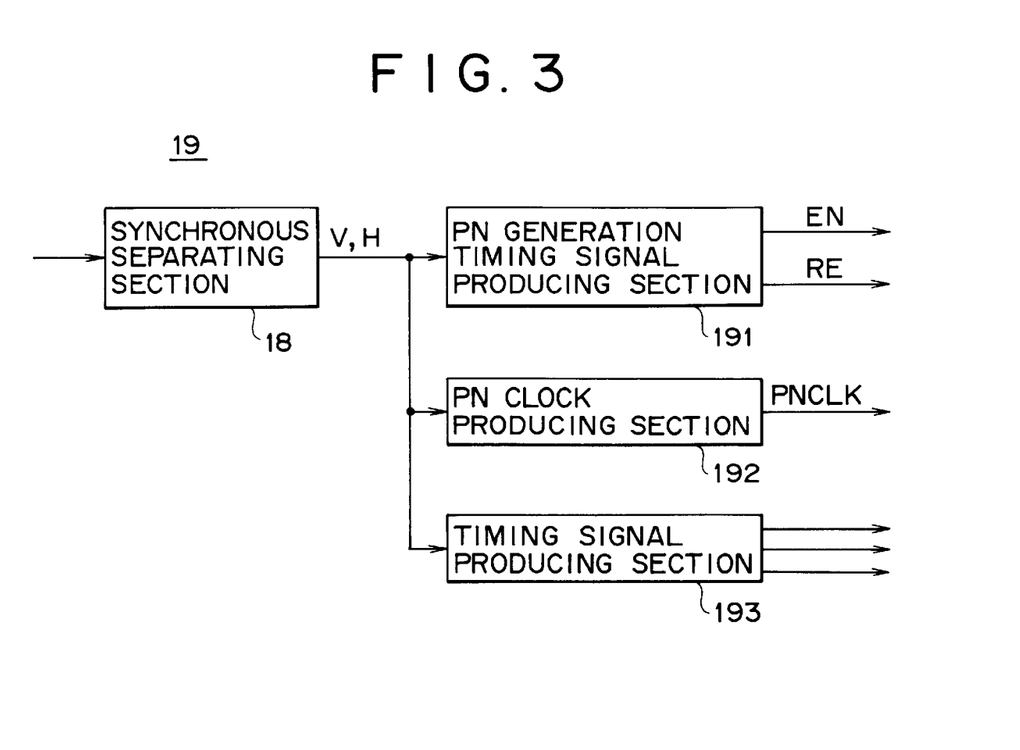
FIG. 3 is a diagram showing a structural example of a part of the apparatus of FIG. 1.

FIG. 3 is a block diagram for explaining the timing signal generating section 19. The timing signal generating section 19 is provided with a PN generation timing signal producing section 191, a PN clock producing section 192 consisting of PLL and a timing signal producing section 193. To the PN generation timing signal producing section 191 and timing signal producing section 193, the horizontal synchronous signal H and vertical synchronous signal V sent from the synchronous separating section 18 are supplied and to the PN clock producing section 192, the horizontal synchronous signal H supplied from the synchronous separating section 18 is supplied.

Figure 4A:
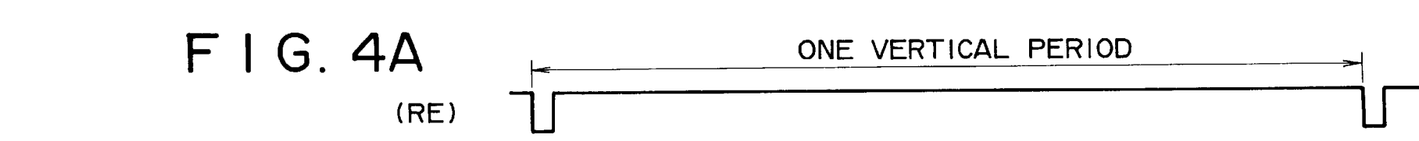
FIGS. 4A to 4F shows a timing chart for explaining operations of a preferred embodiment of the additional information superimposing method of the present invention.

The PN generation timing signal producing section 191 uses the vertical synchronous signal V as the reference signal to produce a vertical period reset signal RE to determine the repetition period of the PN code stream for the spreading to be used for the spectrum spread as shown in FIG. 4A. In this example, the reset signal RE is the vertical period signal which falls, for example, at the front edge of the vertical synchronous signal V.

Figure 4B:
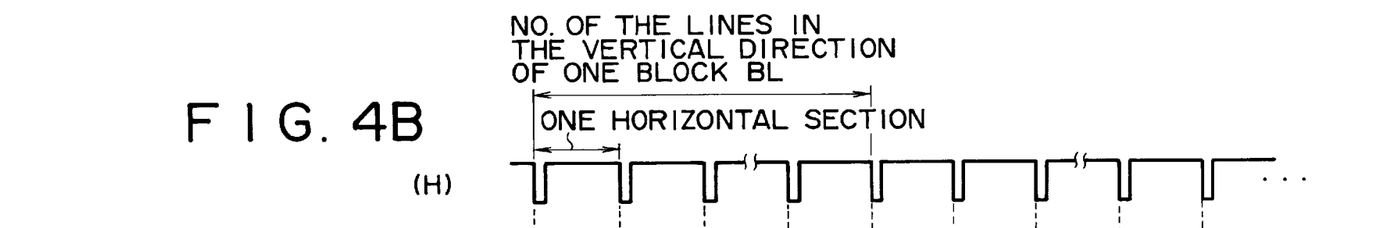
Figure 4C:
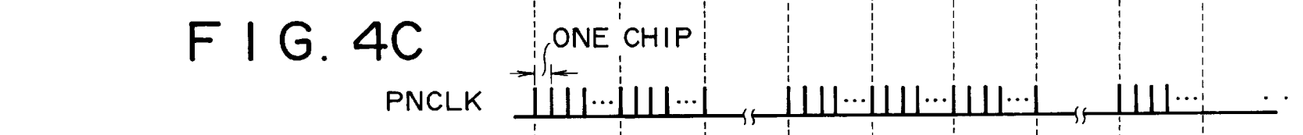
Figure 4D:
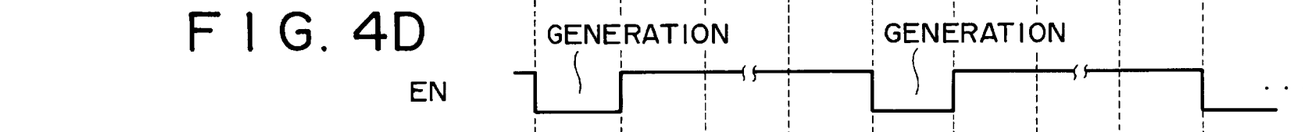

The PN generation timing signal producing section 191 also uses, in the case of this example, the horizontal synchronous signal H (refer to FIG. 4B) as the reference signal to produce the PN generation enable signal EN. In this example, the PN generation enable signal EN is produced (refer to FIG. 4D) as the signal which causes the PN generating section 20 to generate the PN code only for the period of the number of lines N in the vertical direction of the block BL, namely for one horizontal section in every N=8 horizontal sections. As shown in FIG. 4D, this PN generation enable signal EN is low active signal.

The PN clock producing section 192 uses the PLL circuit to produce the PN clock PNCLK (refer to FIG. 4C) having the period of block BL which is synchronized with the horizontal synchronous signal H. Namely, the PN clock PNCLK is the clock signal having the period equal to the number of pixels in the horizontal direction of one block BL, namely the period of 8 ixels in this example. This PN clock PNCLK determines the chip period of spread signal.

Moreover, the timing signal producing section 193 generates, as explained above, the digital video signal and produces various timing signals to be used for the compression process in the apparatus of FIG. 1 on the basis of the vertical synchronous signal V and horizontal synchronous signal H. The timing signal from the timing signal producing section 193 includes the clock in unit of pixel.

The PN generation enable signal EN, reset signal RE and PN clock PNCLK from the timing signal producing section 19 are supplied to the PN generating section 20.

The PN generating section 20 generates the PN code depending on the clock signal PNCLK, enable signal EN and reset signal RE. Namely, the PN generating section 20 is reset by the vertical period, in this embodiment, by the reset signal RE to produce the PN code stream of the predetermined code pattern from the beginning. The PN generating section 20 generates, when it is set to the PN code generation ready condition (enable condition) by the enable signal EN, the PN code stream PS depending on the clock signal PNCLK.

Figure 4E:
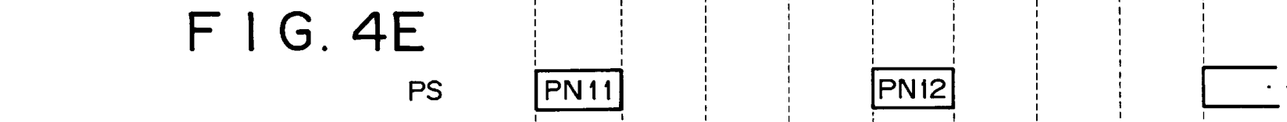

In the case of this embodiment, as is explained above, since the PN generating section 20 is set to the PN code generation ready condition when the enable signal EN is in the low level, it is set, as is shown in FIG. 4D, to the PN code generating condition in the heading one horizontal section among 8 horizontal sections in the vertical direction of one block to generate the PN code in the rate of one chip for every clock of the clock PNCLK. In this case, since the PN generating section 20 is not reset in one vertical section, different PN code streams PN11, PN12, PN13, . . . are produced as shown in FIG. 4E in the PN generating horizontal section.

However, since the PN generating section 20 is reset at the beginning of the vertical section by the reset signal RE, different PN code streams PN11, PN12, PN13, . . . are generated in one heading horizontal section of each block BL in each vertical section as explained above. Here, the reset signal EN, clock signal PNCLK and enable signal EN are of course synchronized with the blocked timing signal.

Figure 5:
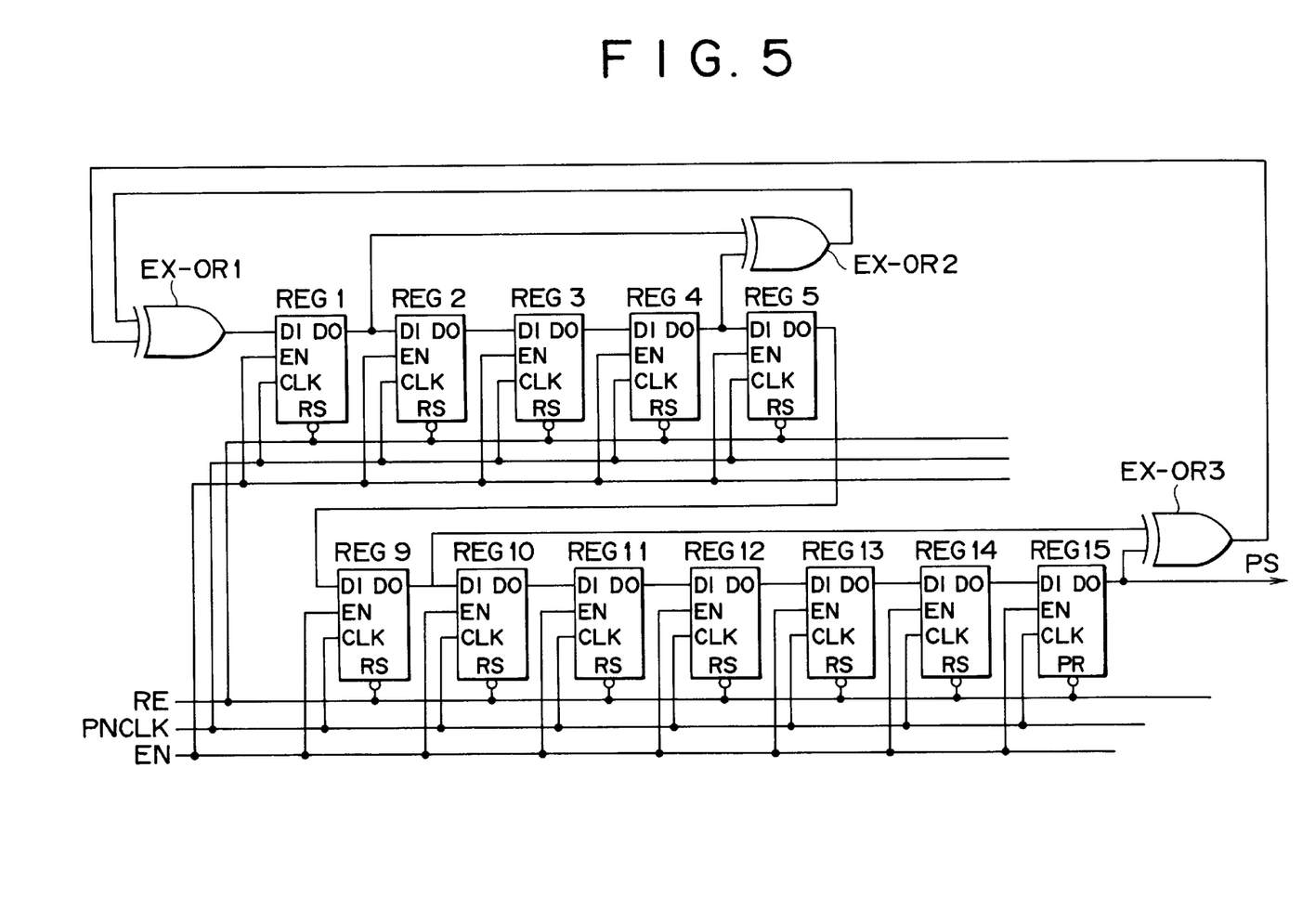
FIG. 5 is a diagram showing a structural example of a part of the apparatus of FIG. 1.

FIG. 5 shows a structural example of the PN generating section 20. The PN generating section 20 of this embodiment is formed of 15 flip-flops REG1 to REG 15 forming the shift register of 15 stages and exclusive OR circuits EX-OR1 to EX-OR3 for calculating the adequate tap output of this shift register. The PN generating section 20 shown in FIG. 5 generates, as explained above, the M series PN code stream PS on the basis of the enable signal EN, PN clock signal PNCLK and PN code reset timing signal RE.

The PN code stream PS from the PN generating section 20 obtained as explained above is supplied to the PN repeating section 21 and the enable signal EN and clock PNCLK from the timing signal generating section 19, although these are not illustrated, are also supplied to the PN repeating section 21.

Figure 6:
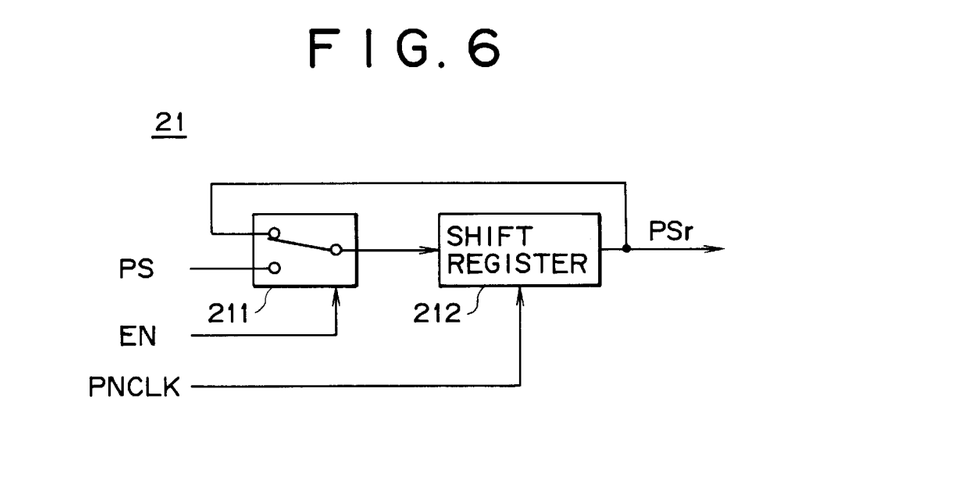
FIG. 6 is a diagram showing a structural example of a part of the apparatus of FIG. 1.
Figure 7A:
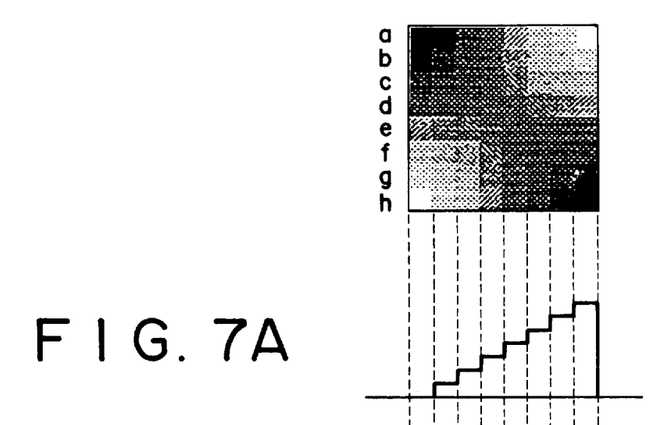
FIGS. 7A to 7H are diagrams showing an example of the superimposing pattern of a preferred embodiment of the additional information superimposing method of the present invention.
Figure 7B:
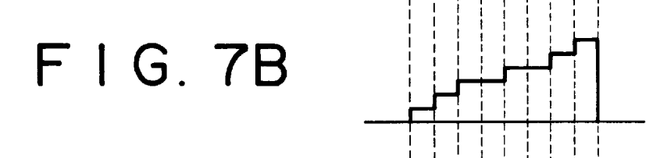
Figure 7C:
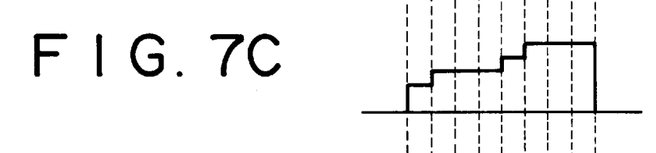
Figure 7D:
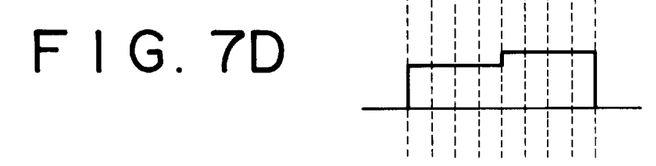
Figure 7E:
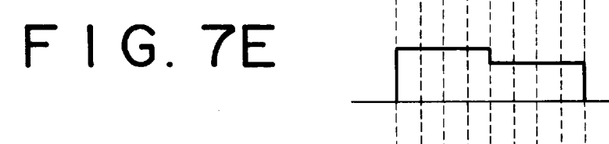
Figure 7F:
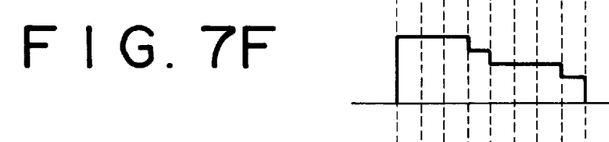
Figures 7G, 7H:
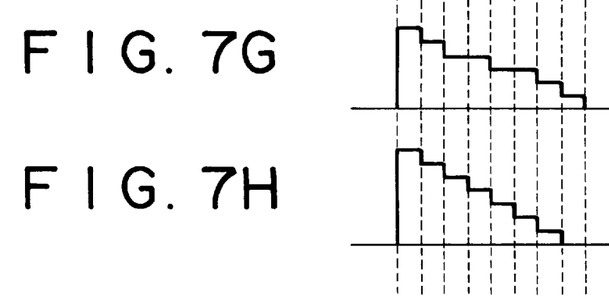

FIG. 6 is a structural example of this PN repeating section 21. Namely, this PN repeating section 21 is formed of a switch circuit 211 and a shift register 212 having the number of stages as many as the number of chips of the PN codes entering one horizontal section. To one input end of the switch circuit 211, the PN code stream PS is supplied and to the other input end, an output of the shift register 212 is supplied.

The enable signal EN is supplied as the switching signal of this switch circuit 211. Thereby, the switch circuit 211 is switched to one input end (PN code stream PS side) in the section where the enable signal EN is in the low level and the PN code stream PS is generated, while the switch circuit 211 is switched to the other input end (output side of the shift register 212) in the section where the enable signal EN is in the high level and the PN code stream PS is not generated. The clock PNCLK is supplied to the shift register 212 as the shift clock.

Therefore, the PN code stream PS consisting of the PN code streams PN11, PN12, PN13, . . . generated in the heading horizontal section of each block BL is respectively transferred in the PN generating section 20 to the shift register 212 through the switch circuit 211. In the remaining horizontal section of each block BL, the PN code stream PS sent from the PN generating section disappears but the switch circuit 211 is switched to the output side of the shift register. Therefore, the shift register 212 repeatedly outputs the PN code streams PN11, PN12, PN13, . . . of one horizontal section fetched by the preceding horizontal section.

Figure 4F:
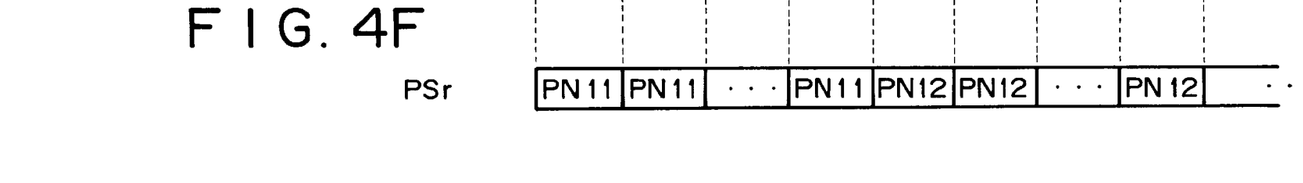

As explained above, in the case of this embodiment, the PN code stream generated in one horizontal section among 8 horizontal sections of each block in the PN generating section 20 is respectively repeated in the subsequent horizontal section in the PN repeating section 21 to produce, as shown in FIG. 4F, the PN code stream PSr where the PN code stream PN11, PN12, PN13, . . . in unit of one horizontal section becomes continuous in each block BL. Namely, one chip of the PN code stream PS is assigned to one block. The PN code stream PSr from the PN repeating section 21 is supplied to the SS duplication preventing control signal producing section 22.

The SS duplication preventing control signal producing section 22 produces the SS duplication preventing control signal by providing a multiplying section for multiplying the duplication preventing control signal supplied and the PN code stream from the PN repeating section 21 for the purpose of spectrum spread. In this case, the duplication preventing control signal supplied to this SS duplication preventing control signal producing section 22 is defined at least to have the same information bit content in one block BL.

The SS duplication preventing control signal producing section 22 supplies the produced SS duplication preventing control signal to a level adding circuit 12 via a superimposing level control section 23.

In this case, the superimposing level control section 23 outputs an analog level depending on a chip value of the SS duplication preventing control signal, namely a positive very low level when the chip value of the SS duplication preventing control signal is "0" or a negative very low level when the chip value is "1". In this case, as explained above, such positive or negative low level is not constant but changes to provide the predetermined fixed pattern in one block.

The superimposing level pattern per block is controlled by the superimposing level control section 23 as shown in FIG. 2B and FIGS. 7A to 7H. As shown in FIG. 2C, this superimposing level pattern is the frequency element included only in the coefficient AC4 located at the position (2,2) when the DC coefficient position is set to the origin (0,0) in the DCT conversion.

Therefore, the SS duplication preventing control signal superimposed as the additional information can be detected from the video signal by extracting only the coefficient AC4, for the purpose of inverse spectrum spread, under the condition of the data of the DCT coefficient before the inverse DCT conversion.

In the case of this embodiment, the superimposing level per block is as shown in FIGS. 7A to 7H in the superimposing level control section 23. Namely, the level changes respectively shown in FIGS. 7A to 7H indicate the changes of level to be superimposed to each pixel of each line a, b, c, d, e, f, g, h of the block shown in FIGS. 7A to 7H.

The superimposing level control section 23 receives the timing signal including the pixel clock supplied from the timing signal generating section 19 and the repeating timing signal from the PN repeating section 21 to determine the superimposing level by setting the superimposing level indicated in FIGS. 7A to 7H for each pixel.

FIGS. 7A to 7H show a pattern of the superimposing level when the positive level is superimposed. When the negative level is superimposed, the similar pattern giving the negative superimposing level direction is used and its frequency element is included only in the DCT coefficient AC4.

The spectrum spread signal obtained from the SS duplication preventing control signal producing section 22 as explained above is then controlled, by the superimposing level control section 23, to become the fixed superimposing pattern as shown in FIGS. 2A to 2C or FIGS. 7A to 7H in unit of block BL and is then supplied to the adding section 12. After addition or subtraction to or from the video signal Vi (addition or subtraction to or from the luminance signal level), the additional signal can be superimposed to the video signal.

Since such superimposing pattern is introduced, level difference at the partitioning level between blocks can be reduced to ½ in comparison with that obtained when the superimposing level per block is set to positive or negative constant level depending on the chip value "0" or "1" and thereby partitioning of superimposing level for each block can be reduced.

The compressed video data transmitted or recorded as explained above includes, when the encoding is conducted, the SS duplication preventing control signal, at the time of inverse DCT arithmetic operation, to the coefficient AC4 which is the comparatively lower frequency element. Therefore, this SS duplication preventing control signal is superimposed to the video signal and is also reproduced therefrom almost without deterioration. Accordingly, the SS duplication preventing control signal can surely be transmitted to execute reliable duplication control.

Moreover, as explained above, at the time of decoding, only the coefficient AC4 element is extracted in the stage before inverse DCT and the spectrum spread duplication preventing control signal can be detected from such element to assure the reliable duplication preventing control.

Detection of the additional information superimposed to the coefficient AC4 means the detection of the additional information to the bit stream signal and therefore it is also possible to prevent the fetching of signal to the memory for duplication. Moreover, in this case, it is also a large merit that only simplified circuit structure may be used for the circuit to detect the additional information because it is not requested to include the inverse DCT circuit.

Figure 8A:
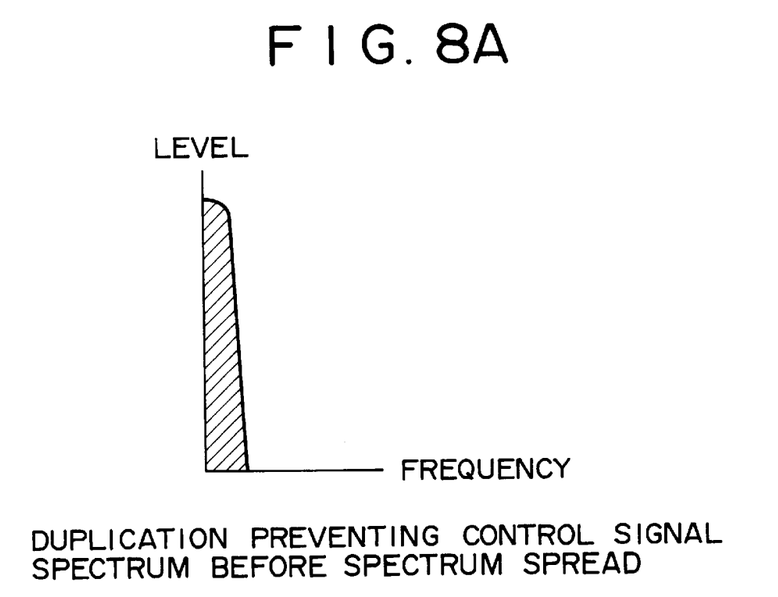
FIGS. 8A to 8D are diagrams for explaining relationship between the information signal and the superimposing level of the spectrum spread signal.
Figure 8B:
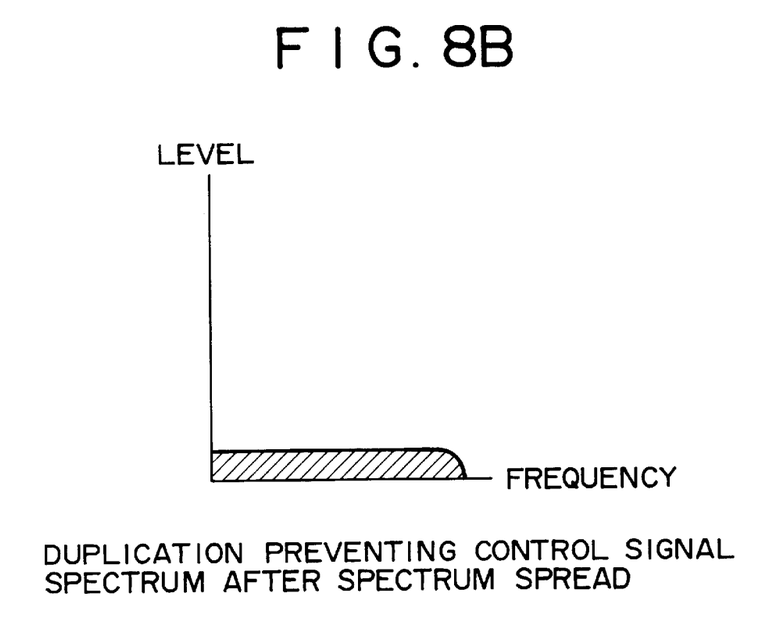

FIGS. 8A to 8D show the relationship between the spectrum spread signal and video signal using spectrum. The spectrum spread additional information is a narrow band signal as shown in FIG. 8A, including less amount of information and having a low bit rate. When the spectrum spread is executed to this signal, the broad band signal as shown in FIG. 8B can be obtained. In this case, level of the spectrum spread signal is reduced inverse-proportion to band spreading ratio.

Figure 8C:
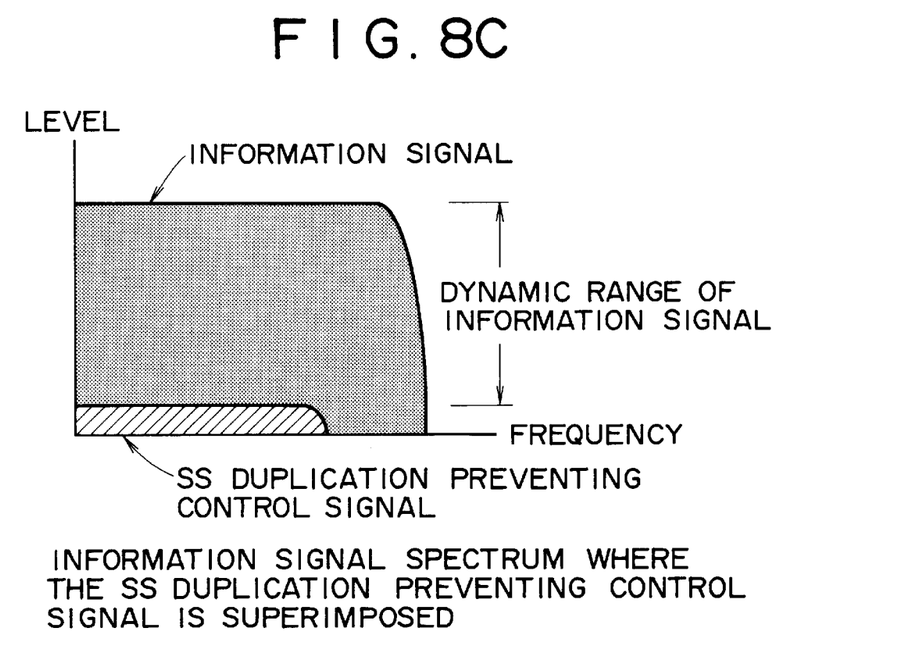

This spectrum spread signal is then superimposed to the video signal in the adding section 12. In this case, as shown in FIG. 8C, the spectrum spread signal can be superimposed in the level lower than the dynamic range of the information signal such as the video signal. With introduction of such superimposing method, the information signal such as the video signal is almost not deteriorated. Therefore, the video signal to which the spectrum spread signal is superimposed is supplied to a monitor receiver. Thereby, influence of the spectrum spread signal almost does not appear on the spectrum spread signal and good reproduced image can be obtained.

Figure 8D:
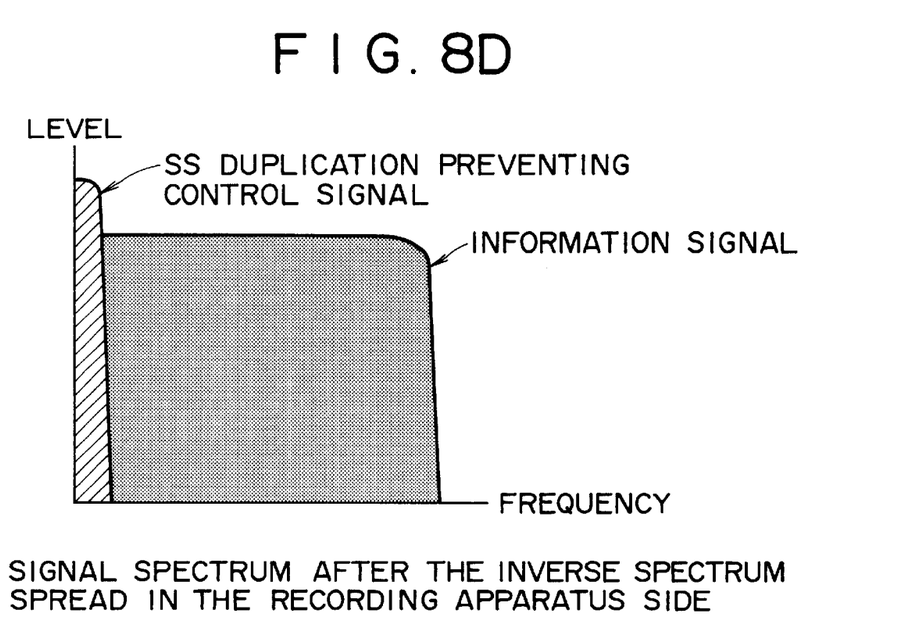

However, as explained later, when the inverse spectrum spread is conducted to detect the superimposed spectrum spread signal, the spectrum spread signal can be recovered again as the narrowband signal as shown in FIG. 8D. By giving sufficient band spreading rate, the power of the inverse spread additional information signal exceeds the information signal making easier the detection thereof.

In this case, since the additional information signal superimposed to information signal such as the video signal is superimposed in the same time and same frequency as information signal such as the video signal, it cannot be deleted or corrected only with use of a frequency filter or by simple replacement of information.

Therefore, the additional information signal such as the duplication preventing control signal as explained above can be transmitted reliably in accompaniment with the video signal, etc. by superimposing the necessary additional information signal to the video signal for recording purpose. In addition, when the additional information signal spectrum spread in the signal with a power lower than the information signal such as the video signal is superimposed to the information signal like the embodiment explained above, deterioration of information signal can be minimized.

Accordingly, when a duplication preventing control signal, for example, is superimposed to the video signal as the additional information signal, since alteration or removal of this duplication preventing signal is difficult, the duplication preventing control which can assure reliable prevention of unfair duplication can be realized.

Moreover, in above structure, since the spectrum spreading is conducted using the PN code stream of the vertical period with the vertical synchronous signal used as the reference signal, the PN code stream for inverse spectrum spreading which is required to detect the spectrum spread signal from the video signal can be produced easily based on the signal synchronized with the vertical synchronous signal. Namely, the synchronous control of the PN code for inverse spreading using, for example, a sliding correlator becomes unnecessary. As explained above, the PN code stream for inverse spreading can be produced easily, the inverse spectrum spread can be executed quickly to detect the additional information signal such as the duplication preventing control signal spectrum spread quickly and superimposed to the video signal.

In the example of FIG. 1, the SS duplication preventing control signal is superimposed to the analog video signal but it is of course possible to superimpose such SS duplication preventing control signal to the digital video signal after the A/D conversion or block division.

As the superimposing level pattern in the superimposing level control section 23, not only the pattern explained using FIGS. 2A to 2C and FIGS. 7A to 7H but also various fixed patterns may be used.

Figure 9A:
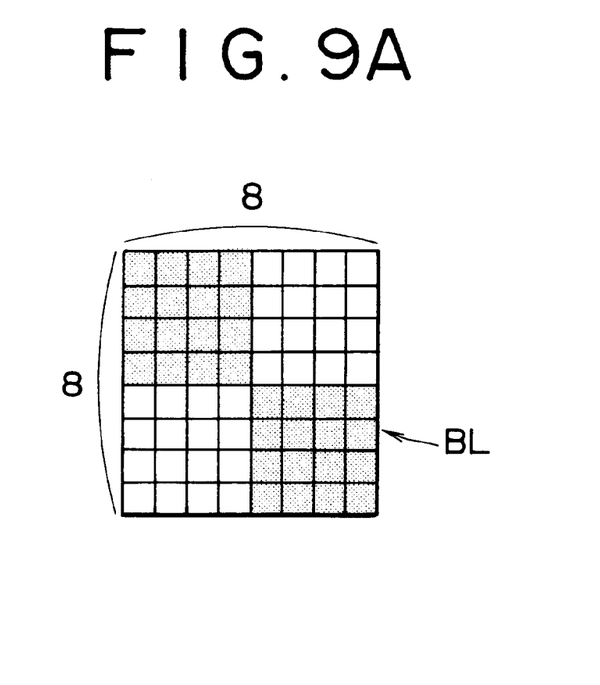
FIGS. 9A and 9B are diagrams showing the other example of a preferred embodiment of the additional information superimposing method of the present invention.

For example, as shown in FIG. 9A, it is also possible that one block BL is divided into four regions and two divided regions arranged in the diagonal direction can be set to different levels. In this case, bright and dark patterns depending on the level change form a check pattern on the entire part of the image and thereby the superimposing level change pattern at the partitioning area in unit of block can be lowered.

In the case of the pattern of FIG. 9A, the frequency element is spread to a plurality of AC coefficients of the DCT coefficient, but it is also possible to detect the additional information superimposed to the video signal before the inverse DCT conversion, as explained above, using a plurality of AC coefficients.

Figure 9B:
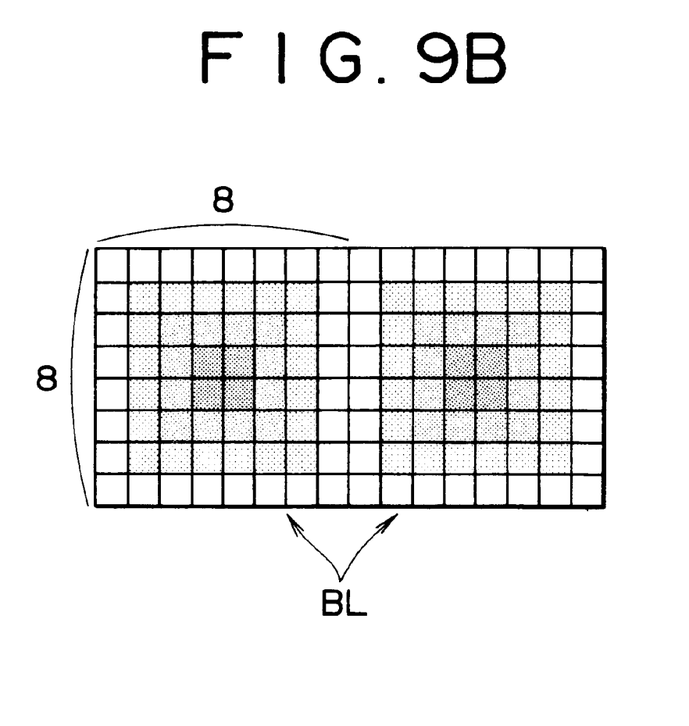

The example of FIG. 9B is the superimposing level pattern in which the superimposing level of the pixels around the rectangular block BL is set in common to all blocks in order to alleviate the partitioning in unit of block and the level is gradually changed toward the center pixel of the block from the peripheral pixels.

In the case of the pattern of FIG. 9B, the frequency element is spread to a plurality of AC coefficients of the DCT coefficient, but the additional information superimposed to the video signal can be detected before the inverse DCT conversion, like the above case, using a plurality of AC coefficients.

In above explanation, the SS additional information is superimposed to the video signal under the condition that one chip corresponds to one block, but such superimposing is also possible under the condition that the blocks of more than one block, for example, the macro-block corresponding to four blocks correspond to one chip.

Moreover, it is also possible for the superimposing that one chip is assigned, not to the block consisting of a plurality of pixels in both horizontal and vertical directions, but to the block consisting of a plurality of pixels in one direction of the horizontal and vertical directions.

Moreover, the reset period of the spread code for spectrum spread may be a plurality of vertical periods in place of one vertical period. Moreover, the reset period of the spread code may be one horizontal period or a plurality of horizontal periods.

In above example, the superimposing level is set to positive or negative depending on the chip value "0" and "1" of the spread code, but it is also possible to superimpose the additional signal under the condition that one is 0 level and the other is positive or negative level. In this case, the present invention can be applied by setting the superimposing level pattern of the fixed pattern as explained above in regard to the positive or negative level.

In above explanation, the additional information signal superimposed through the spectrum spread is a duplication preventing control signal, but as this additional information signal, not only the duplication preventing control signal but also the information regarding a digital video signal, for example, a time code information for identifying each field and copy right information may be used. As the copy right information, for example, an apparatus number for identifying the relevant recording apparatus may be used. When this apparatus number is superimposed to the digital video signal Vi, history of duplication can be searched easily.

In addition, in above explanation, the spectrum spread signal is superimposed to an analog video signal, but it is of course possible to superimpose the spectrum spread signal to the digital video signal and the present invention can naturally be applied thereto.

Moreover, in above explanation, the additional information bit is spectrum spread with the PN code, but the present invention can be applied to the case where the spectrum spread signal is detected by superimposing the PN code of different series depending on the additional information bit and then detecting these PN codes.

The present invention can also be applied to the case where the PN code itself is superimposed to the video signal as the spectrum spread signal by determining that "1" is transmitted, for example, when the PN code is superimposed or "0" is transmitted when the PN code is not superimposed.

Moreover, the spread code is not limited to the PN code and the other code such as Gold code may also be used.

In addition, the present invention can also be applied when the additional information is not superimposed through the spectrum spread but is imposed in such a very low level as not giving influence on the reproduced image in unit of one pixel and a plurality of pixels.

In above explanation, the present invention is applied to the recording and reproducing system, but can also be applied to the case where the additional information is superimposed to the video signal for the purpose of transmission by way of various transmission media, for example, electromagnetic wave, cable and infrared beam.

As explained above, according to the present invention, when the very low level additional information is superimposed in unit of a plurality of pixels of the video signal, such additional information can be superimposed in such a manner that influence of the superimposing pattern can be reduced as much as possible in the reproduced image and the additional information can be detected easily.

What is claimed is:

1. A method of superimposing an additional information signal on a video signal, comprising the steps of:
    producing, in synchronization with said video signal, a spectrum spread code having chip sections wherein each of said chip sections corresponds to a period of a plurality of predetermined pixels of an image of said video signal;
    producing a spectrum spread additional information signal by spectrum spreading said additional information signal with said spectrum spread code;
    producing a level changed spectrum spread additional information signal by sequentially changing a level of said spectrum spread additional information signal with a predetermined pattern within said period of said plurality of predetermined pixels corresponding to each of said chip sections; and
    producing an output video signal by superimposing said level changed spectrum spread additional information signal on said video signal.

2. The method of superimposing an additional information signal on a video signal according to claim 1, wherein said level of said spectrum spread additional information signal is sequentially changed as one of a positive and a negative value in said period of said plurality of predetermined pixels.

3. The method of superimposing an additional information signal on a video signal according to claim 2, wherein said level of said spectrum spread additional information signal is sequentially changed for for one of every one and every several of said predetermined pixels in said period of said plurality of said predetermined pixels.

4. The method of superimposing an additional information signal on a video signal according to claim 1, wherein a plurality of blocks, each formed of a plurality of identical chips arranged in a vertical direction on a video display screen, are formed by repeatedly producing an identical spectrum spread code for a plurality of predetermined horizontal sections of said video signal.

5. The method of superimposing an additional information signal on a video signal according to claim 4, wherein said level of said spectrum spread additional information signal is sequentially changed, in each block of said plurality of blocks, with said predetermined pattern in horizontal and vertical directions on a video display screen.

6. The method of superimposing an additional information signal on a video signal according to claim 4, wherein said video signal is a digital video signal and is compressed through DCT (discrete cosine) conversion in each block of said plurality of blocks and said predetermined pattern for changing said level of said spectrum spread additional information signal in said plurality of blocks is a frequency element included in one of one DCT coefficient and a plurality of DCT coefficients in said plurality of blocks.

7. An apparatus for superimposing an additional signal on a video signal, comprising:
    spectrum spread code producing means for producing, in synchronization with said video signal, a spectrum spread code having chip sections wherein each of said chip sections correspond to a period of a plurality of predetermined pixels of an image of said video signal;
    spectrum spreading means for producing a spectrum spread additional information signal by spectrum spreading said additional information signal with said spectrum spread code;
    level control means for producing a level changed spectrum spread additional information signal by sequentially changing a level of said spectrum spread additional information signal with a predetermined pattern in said period of said plurality of predetermined pixels corresponding to each of said chip sections; and
    signal superimposing means for producing an output video signal by superimposing said level changed spectrum spread additional information signal on said video signal.

8. The apparatus for superimposing an additional information signal on a video signal according to claim 7, wherein said level control means sequentially changes said level of said spectrum spread additional information signal as one of a positive and a negative value in said period of said plurality of predetermined pixels.

9. The apparatus for superimposing an additional information signal on a video signal according to claim 8, wherein said level control means sequentially changes said level of said spectrum spread additional information signal for one of every one and every several of predetermined pixels among said plurality of said predetermined pixels in said period of said plurality of predetermined pixels.

10. The apparatus for superimposing an additional information signal on a video signal according to claim 7, wherein said spectrum spread code producing means repeatedly produces an identical spectrum spread code for all predetermined horizontal sections of said video signal for forming a plurality of blocks formed of a plurality of identical chips arranged in a vertical direction on a video display screen.

11. The apparatus for superimposing an additional information signal on a video signal according to claim 10, wherein said level of said spectrum spread additional information signal is sequentially changed, in each block of said plurality of blocks, with said predetermined pattern in horizontal and vertical directions on a video display screen.

12. The apparatus for superimposing an additional information signal on a video signal according to claim 10, further comprising compressing means for compressing said video signal by a DCT (discrete cosine) conversion in each block of said plurality of said blocks and said predetermined pattern for changing said level of said spectrum spread additional information signal in said plurality of blocks is a frequency element included in one of one particular DCT coefficient and a plurality of DCT coefficients of each block of said plurality of blocks.

* * * * *